US007757161B2

(12) United States Patent
Wheadon et al.

(10) Patent No.: US 7,757,161 B2

(45) Date of Patent: Jul. 13, 2010

(54) APPARATUS AND METHOD FOR AUTOMATICALLY SIZING FIELDS WITHIN REPORTS

(75) Inventors: Blair Thomas Wheadon, Vancouver (CA); Henry Kam, Vancouver (CA)

(73) Assignee: Business Objects Software Ltd, Dublin (IE)

( * ) Notice: Subject to any disclaimer, the term of this patent is extended or adjusted under 35 U.S.C. 154(b) by 1028 days.

(21) Appl. No.: 11/377,230

(22) Filed: Mar. 15, 2006

(65) Prior Publication Data

US 2007/0220488 A1 Sep. 20, 2007

(51) Int. Cl.
*G06F 15/00* (2006.01)
*G06F 17/00* (2006.01)

(52) U.S. Cl. ....................... 715/225; 715/226; 715/253; 715/254; 715/269; 715/271; 358/2.1; 358/1.18

(58) Field of Classification Search ................ 715/225, 715/226, 253, 264, 269, 271; 358/2.1, 1.18
See application file for complete search history.

(56) References Cited

U.S. PATENT DOCUMENTS 5,416,903 A * 5/1995 Malcolm .................... 715/703
5,754,873 A * 5/1998 Nolan ........................ 715/235
5,862,310 A * 1/1999 Crawford et al. ........... 358/1.18
6,055,550 A * 4/2000 Wallack ...................... 715/229
7,231,396 B2 * 6/2007 Ayachitula et al. .......... 707/101
2002/0120859 A1 * 8/2002 Lipkin et al. ................ 713/200
2002/0152189 A1 * 10/2002 Crim ............................ 707/1
2002/0188896 A1 12/2002 Filteau et al.
2003/0004946 A1 * 1/2003 VanDenAvond et al. ....... 707/9
2004/0015783 A1 * 1/2004 Lennon et al. .............. 715/523
2005/0021516 A1 1/2005 Potter et al.
2006/0036448 A1 * 2/2006 Haynie et al. .................. 705/1
2006/0101442 A1 5/2006 Baumgart et al.
2006/0103588 A1 5/2006 Chrisop et al.
2006/0197982 A1 * 9/2006 Bell et al. .................. 358/1.18
2006/0206860 A1 * 9/2006 Dardinski et al. ........... 717/105
2006/0206866 A1 * 9/2006 Eldrige et al. .............. 717/122
2006/0242553 A1 10/2006 Kulas et al.
2006/0277476 A1 12/2006 Lai
2006/0279769 A1 12/2006 Ludwig et al.
2007/0013697 A1 * 1/2007 Gilboa ....................... 345/440
2007/0157155 A1 * 7/2007 Peters ........................ 717/100
2007/0204010 A1 * 8/2007 Sah et al. .................... 709/219

OTHER PUBLICATIONS

FitzGerald, Neil et al.; Special Edition Using® Crystal Reports® 10, Publisher: Que, Pub Date: Jul. 14, 2004, pp. 1-11.*
International Search Report for International Application No. PCT/US07/63996 mailed Oct. 9, 2008.

* cited by examiner

*Primary Examiner*—Doug Hutton
*Assistant Examiner*—Nathan Hillery
(74) *Attorney, Agent, or Firm*—Cooley LLP

(57) ABSTRACT

A computer readable medium stores executable instructions to specify a report with a report field for displaying information. An assessment of information that will be potentially displayed in the report field is performed. The report field is sized in accordance with the assessment.

5 Claims, 9 Drawing Sheets

26

34

APPARATUS AND METHOD FOR AUTOMATICALLY SIZING FIELDS WITHIN REPORTS

BRIEF DESCRIPTION OF THE INVENTION

This invention relates generally to data processing. More particularly, this invention relates to techniques for automatically sizing fields within reports.

BACKGROUND OF THE INVENTION

There are a number of commercially available products to produce reports from stored data. For instance, Business Objects Americas of San Jose, Calif., sells a number of widely used report generation products, including Crystal Reports™, Business Objects OLAP Intelligence™, Business Objects Web Intelligence™, and Business Objects Enterprise™. As used herein, the term report refers to information automatically retrieved (i.e., in response to computer executable instructions) from a data source (e.g., a database, a data warehouse, a plurality of reports, and the like), where the information is structured in accordance with a report schema that specifies the form in which the information should be presented. A non-report is an electronic document that is constructed without the automatic retrieval of information from a data source. Examples of non-report electronic documents include typical business application documents, such as a word processor document, a presentation document, and the like.

A report document specifies how to access data and format it. A report document where the content does not include external data, either saved within the report or accessed live, is a template document for a report rather than a report document. Unlike other non-report documents that may optionally import external data within a document, a report document by design is primarily a medium for accessing and formatting, transforming or presenting external data.

A report is specifically designed to facilitate working with external data sources. In addition to information regarding external data source connection drivers, the report may specify advanced filtering of data, information for combining data from different external data sources, information for updating join structures and relationships in report data, and logic to support a more complex internal data model (that may include additional constraints, relationships, and metadata).

In contrast to a spreadsheet, a report is generally not limited to a table structure but can support a range of structures, such as sections, cross-tables, synchronized tables, sub-reports, hybrid charts, and the like. A report is designed primarily to support imported external data, whereas a spreadsheet equally facilitates manually entered data and imported data. In both cases, a spreadsheet applies a spatial logic that is based on the table cell layout within the spreadsheet in order to interpret data and perform calculations on the data. In contrast, a report is not limited to logic that is based on the display of the data, but rather can interpret the data and perform calculations based on the original (or a redefined) data structure and meaning of the imported data. The report may also interpret the data and perform calculations based on pre-existing relationships between elements of imported data. Spreadsheets generally work within a looping calculation model, whereas a report may support a range of calculation models. Although there may be an overlap in the function of a spreadsheet document and a report document, these documents express different assumptions concerning the existence of an external data source and different logical approaches to interpreting and manipulating imported data.

A report schema commonly specifies report fields that display data from a data source. The report schema commonly specifies the position of a report field with respect to other report fields. In addition, the report schema may specify the position of a report field with respect to fixed text components defined by the report schema. As used herein, a report field is synonymous with a report object.

Report design requires a designer to consider a number of factors. Current tools do not help a report designer to determine the appropriate space to allocate for report fields. This is problematic since the report field size may be highly variable. For example, the report field size may be a function of the size of the data to be displayed in the report field and/or the font information associated with the data (e.g., font type, font size, font style, and the like). In addition, some reports support multiple languages. In this case, report field sizing may vary from language to language.

In view of the foregoing, it would be desirable to provide a technique for facilitating report field sizing.

SUMMARY OF THE INVENTION

The invention includes a computer readable medium storing executable instructions. The executable instructions specify a report with a report field for displaying information. The executable instructions perform an assessment of information that will potentially be displayed in the report field. The report field is then sized in accordance with the assessment.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
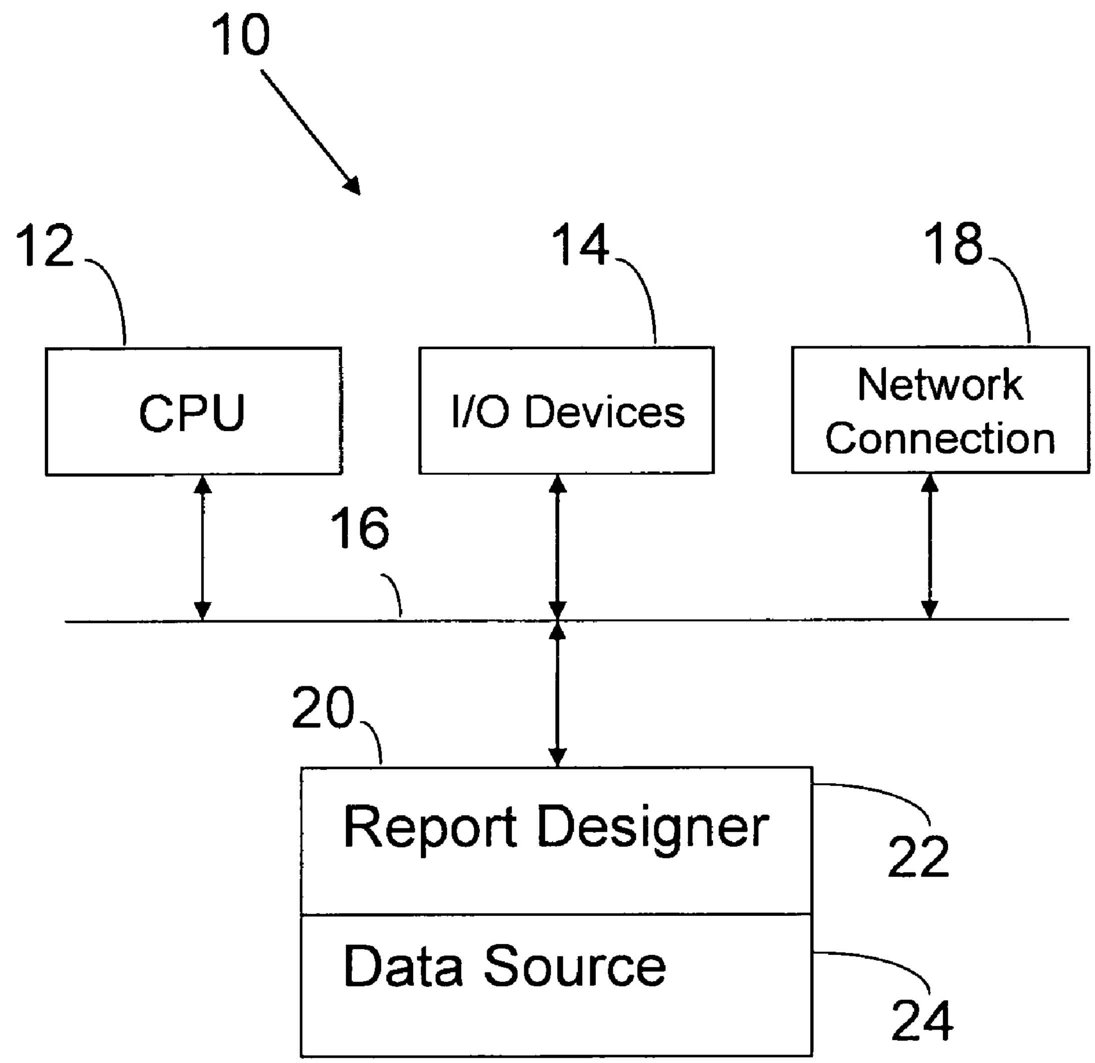
FIG. 1 illustrates a computer configured in accordance with an embodiment of the invention.

FIG. 1 illustrates a computer 10 configured in accordance with an embodiment of the invention. The computer 10 includes a central processing unit 12 connected to a set of input/output devices 14 via a bus 16. The input/output devices 14 may include a keyboard, mouse, display, printer, and the like. A network connection circuit 18 is also connected to the bus 16 to facilitate network communications. A memory 20 is also connected to the bus 16. The memory 20 stores executable instructions to implement operations of the invention. In particular, the memory 20 stores a report designer 22, which is also referred to herein as a report designer application (RDA). The report designer 22 includes executable instructions to automatically size report fields within a report. The report designer 22 may form a part of a general reporting tool or may augment a general reporting tool. Regardless of the implementation, the report designer 22 works with the reporting tool to access a data source 24 to create a report. Fields within the report are automatically sized utilizing techniques of the invention.

Figure 2:
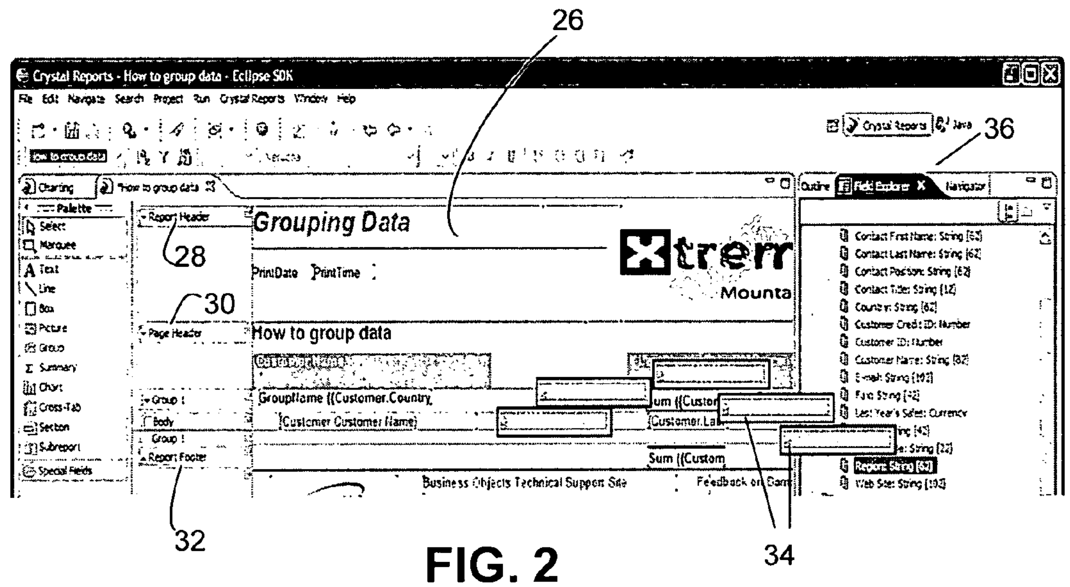
FIG. 2 illustrates report fields that may be sized in accordance with an embodiment of the invention.

FIG. 2 illustrates a report 26 with a report header 28, a page header 30, and a page footer 32. Within the report 26 are various report fields 34. Each report field 34 is configured to display information from the data source 24.

Figure 3:
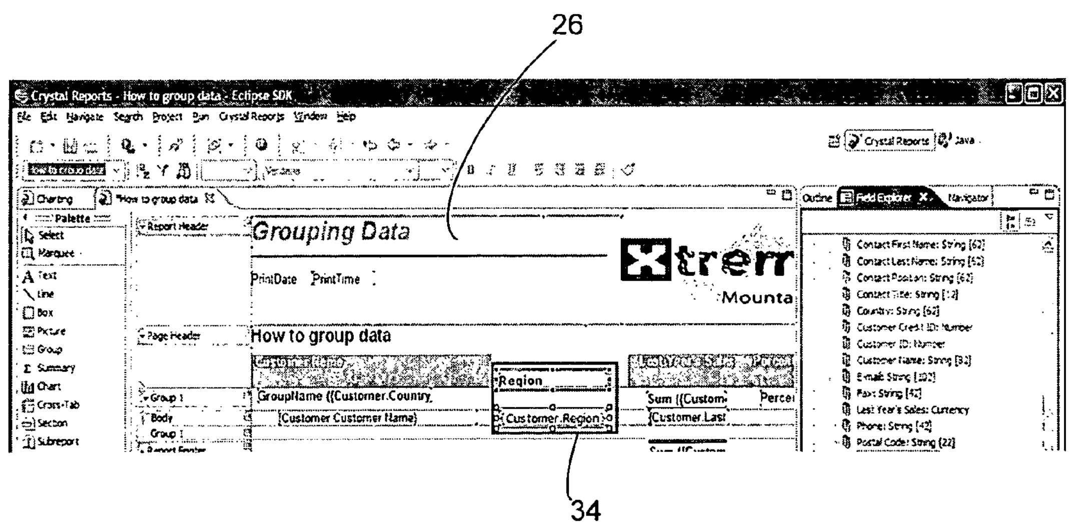
FIG. 3 illustrates the sizing of a report field in accordance with an embodiment of the invention.

Report fields 34 may be dragged from a field explorer 36. Alternately, the position of each report field 34 is specified by pre-existing schema associated with the report 26. Once the report fields are defined, the report designer 22 accesses the data source 24 and samples a set of N values. The system applies the default font type and size to each value retrieved from the data source 24 and records the width of the field in that font. The report designer 22 saves the largest width and uses that width to size the width of the report field 34. Thus, the user has immediate feedback from the report designer 22 regarding the amount of space that the report field 34 requires. FIG. 3 illustrates a report field 34 sized to accommodate the data that it is designed to display.

Figure 4:
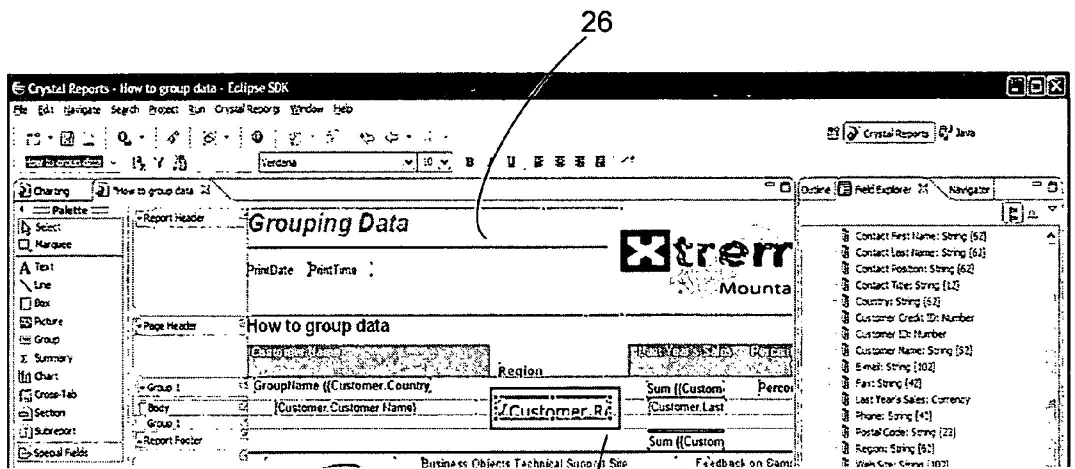
FIG. 4 illustrates font re-sizing that may be accommodated in accordance with an embodiment of the invention.
Figure 5:
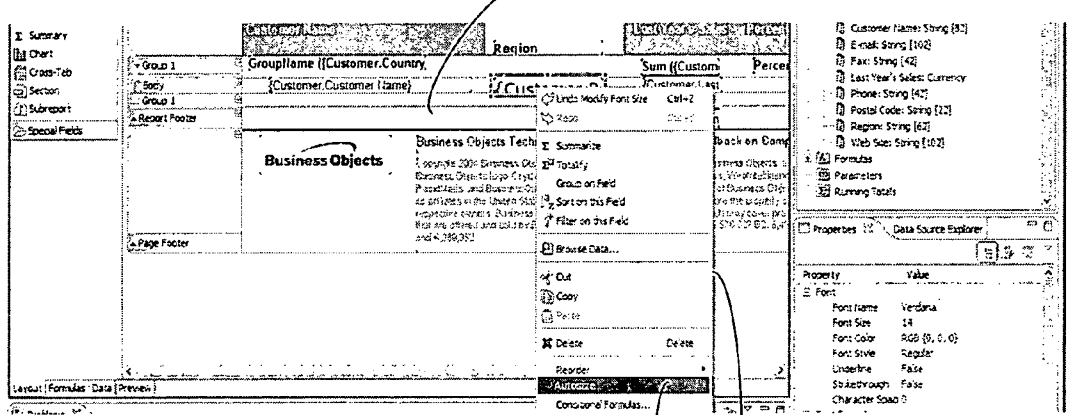
FIG. 5 illustrates the invocation of automatic sizing operations in accordance with an embodiment of the invention.
Figure 6:
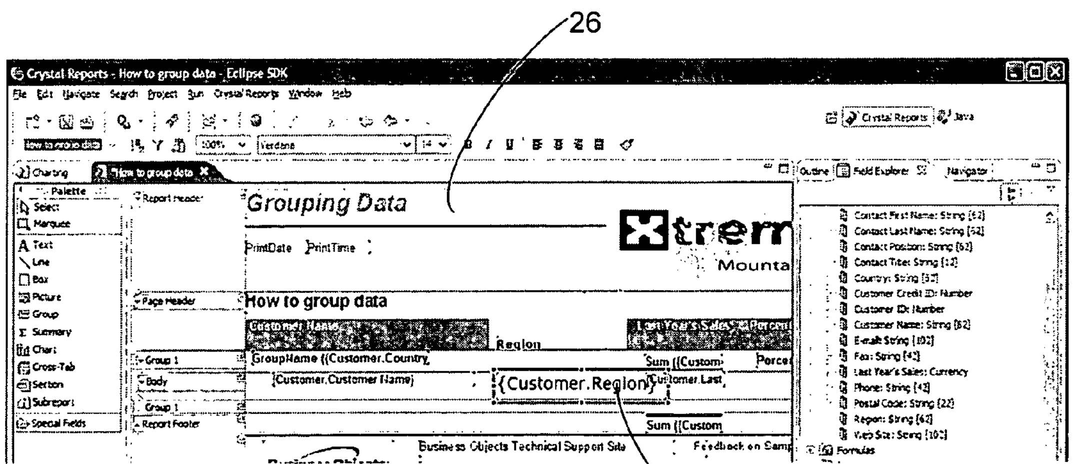
FIG. 6 illustrates report field re-sizing in accordance with an embodiment of the invention.

At this point, if the user alters the font size of the report field 34, the report designer 22 changes the font in the report design, as shown in FIG. 4. The size of the report field or text box 34 does not change, thus the text cannot be read in its entirety. To solve this problem, the report designer 22 allows the user to automatically resize the report field to accommodate the new font size. For example, by right clicking on the report field 34, the menu 37 of FIG. 5 may be displayed. The menu may include an automatic sizing option ("Autosize") 38. Selection of the autosize option 38 causes the report designer 22 to update the width and height of the report field 34 to accommodate the new font size. FIG. 6 illustrates the appropriately sized report field 34.

Thus, in accordance with an embodiment of the invention, a report with a report field is specified. An assessment is made of information that will potentially be displayed in the report. The report field is then sized in accordance with the assessment. This operation may be repeated if font information is altered, such as the font type, the font style, or the font size. Similarly, this operation may be repeated when values in the underlying data source change. In some embodiments, a report field may be implemented using different languages. The invention sizes the report field in accordance with the multi-lingual options, as discussed below. The report field may be sized automatically. Alternately, the system may recommend a report field size to the user.

The invention is more fully appreciated with reference to more specific examples. In discussing these examples, reference is made to dynamic fields. A dynamic field is a report region that may display different values (e.g., text or numeric) from an alterable data source. The size of the report region is a function of the largest value that may be displayed in the report. The size of the report region is also a function of font information, such as font type, font style, and font size. The different values from the data source may include multilingual text expressions to support reports in different languages. Certain languages need to use specific fonts in order for the characters to render properly.

Reference is also made herein to static fields. A static field is a report region that may display different values (e.g., text or numeric) from a fixed or unalterable data source. In this case, different strings may be used in a report field, but the set of strings is fixed or unalterable.

The invention also processes multi-value text objects. Both static and dynamic text objects can contain multi-value text objects. Multi-lingual text objects are a common scenario, but the multi-values associated with a field could be based on another differentiator. For example a report could have: (1) a legal external version, (2) an internal distribution version, and/or (3) a personal use version that contains different content and font formatting for the fields. The legal external version might have longer versions of the static strings in order to include disclaimers and clarification. The internal distribution version might have simpler static strings for internal users that do not require lengthy explanation. The personal version might have more informal static strings. Likewise, the reports might use dynamic values from different tables based on the stringency of the data required by the three reports, with the legal external version using a table of data that has been validated by accounting and the personal report using data from a data source that has not yet been validated.

The invention also processes combined dynamic and static objects. Objects, such as tables in reports, often contain a combination of both dynamic and static fields that need to be calculated in order to accommodate the text strings properly. These combined dynamic/static fields may also need to factor in multi-values (or multilingual values) for any of the fields.

The invention also accommodates combined dynamic/static fields that have multi-lingual text. Multilingual reporting often uses dynamic text objects from multiple language databases or tables and static fields within the report that are stored as different strings for different locales. In combination, static and dynamic text object auto-sizing can provide a full solution for a report that has different language versions of its static labels and accesses different language versions for the data.

As previously indicated, the invention also processes font information. For example, font face type, font size, and font style or effect (bold, italic, underline, etc) can be associated with a specific version of a multi-value text object field. For example, a report might specify that the English version uses Times New Roman, 10 point, plain face font, the Russian version uses Cyrillic standard, 8 point, bold, and the Japanese version uses an Arial Unicode MS, 12 point, plain face font. The values for font face style, size, and effect can be associated with and determined based on a differentiator other than language.

The invention handles both static and dynamic fields, calculating the appropriate size for optimal display of these text fields. It enables the report designer to understand the length of the text field that is returned and how it should be handled within the report format. The invention is particularly applicable to multilingual reports.

Figure 7:
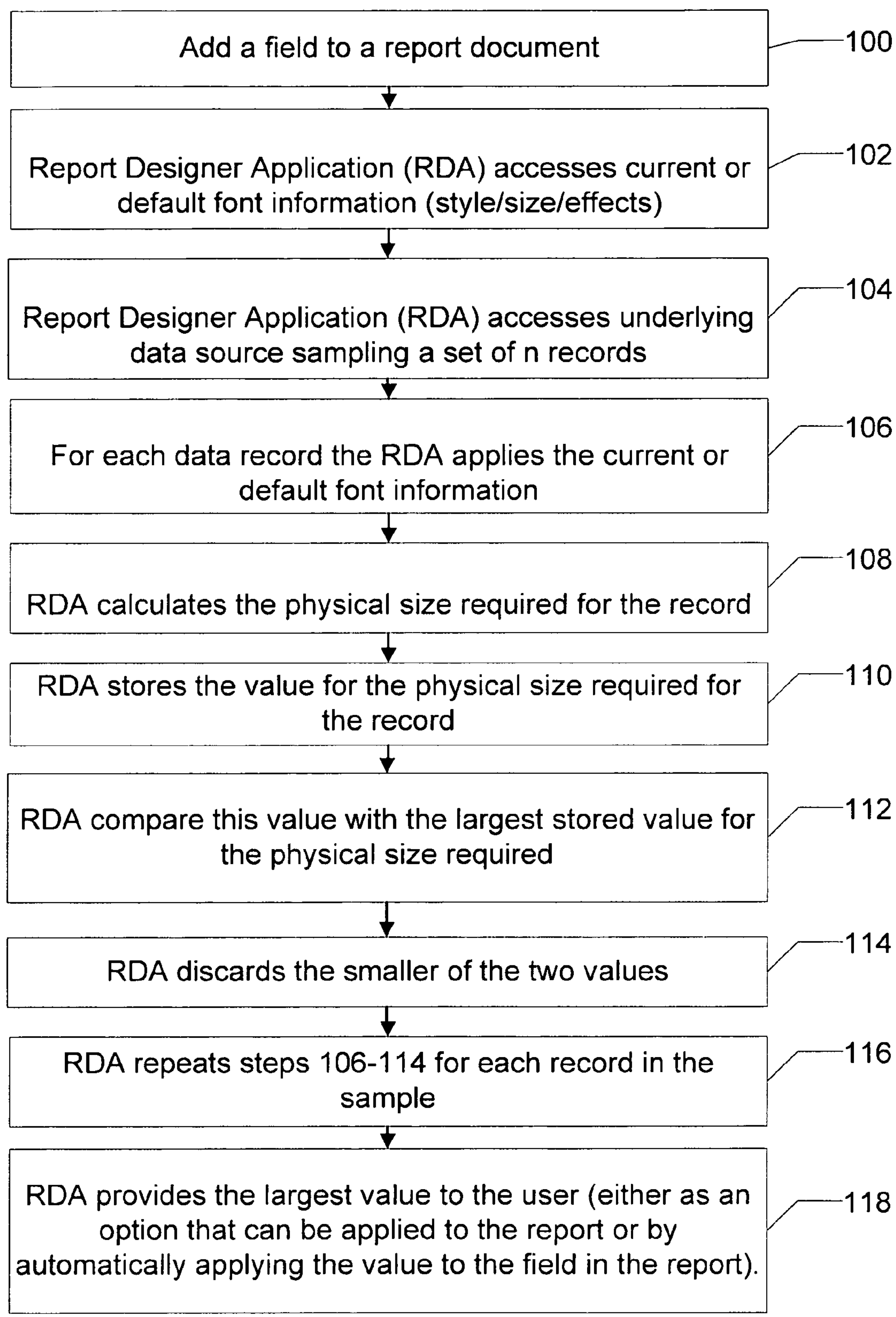
FIG. 7 illustrates a process for report field sizing of dynamic values in accordance with an embodiment of the invention.

FIG. 7 illustrates processing operations performed by the report designer 22 to accommodate dynamic values associated with a report field. A report field is added to a document 100. The report designer 22 accesses the current or default font information 102. The report designer 22 then accesses the underlying data source to sample a set of records (e.g., N records) 104. For each data record, the report designer 22 applies the current or default font information 106. The report designer 22 calculates the physical size required for the record 108. The report designer 22 stores the value for the physical size required for the record 110. The report designer 22 then compares this value with the largest stored value for the physical size required 112. The report designer 22 then discards the smaller of the two values (i.e., stores the larger of the two values) 114. The operations of blocks 106-114 are then repeated for each record in the sample 116. The report designer 22 then supplies the largest value to the user, e.g., as an option that can be applied to the report or by automatically applying the value to the field in the report 118.

Dynamic objects may also be evaluated to determine whether the data source/report design/query associated metadata contains multi-lingual data for the report. In the case where the dynamic field uses multi-lingual data, the sample is designed to cover multi-lingual data and any font information related to the multi-lingual data. In some implementations, statistical algorithms concerning the probability of longer string lengths within a locale language are used to determine which language data is incorporated in the sample set.

Figure 8:
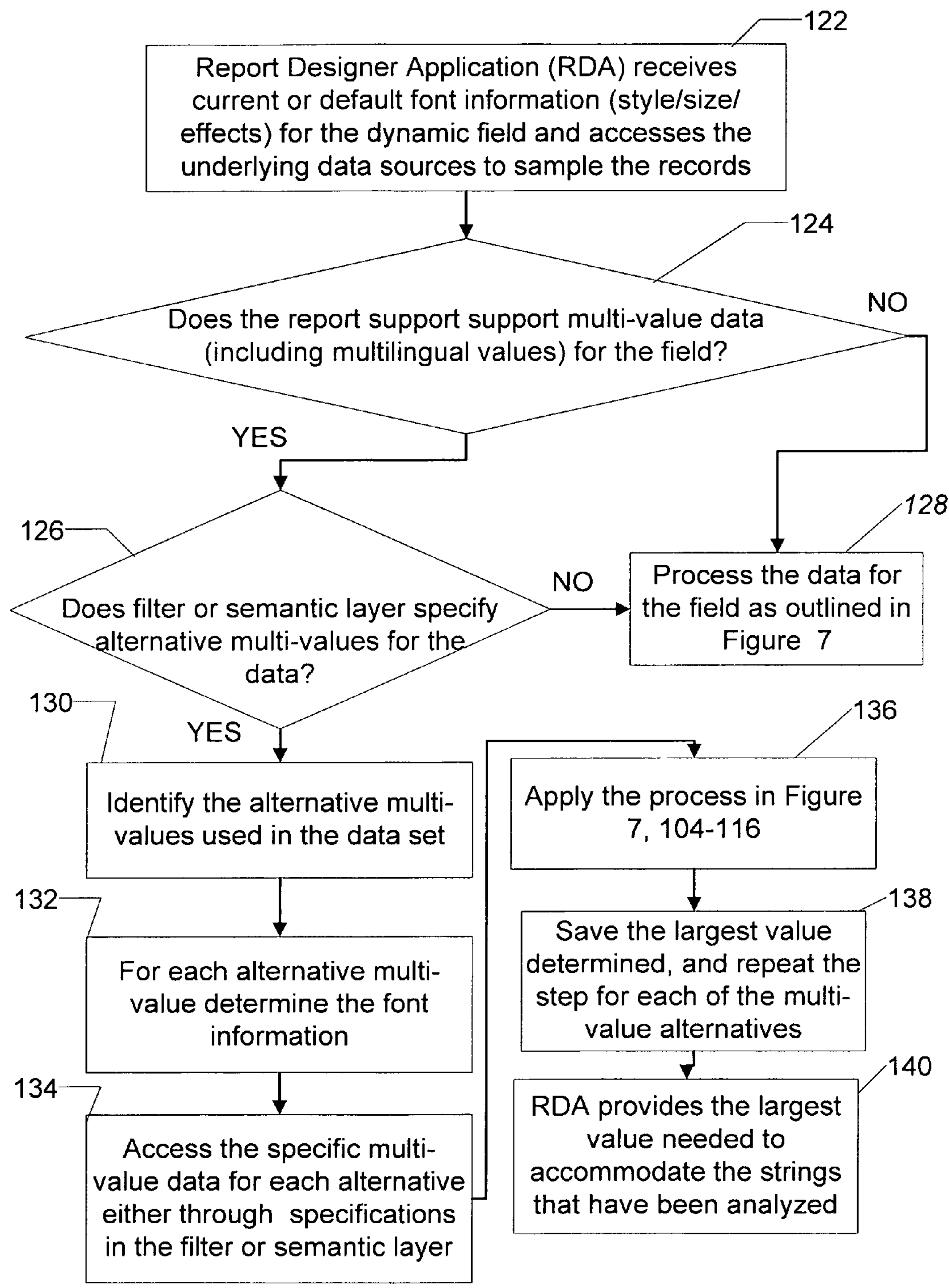
FIG. 8 illustrates a process for report field sizing dynamic and multi-lingual objects in accordance with an embodiment of the invention.

FIG. 8 illustrates the processing of dynamic and multilingual values. The report designer 22 receives current or default font information for the dynamic field and accesses the underlying data source 24 to sample the records 122. It is then determined whether the report supports multi-value data (e.g., multi-lingual values) 124. If not, the data is processed as outlined in FIG. 7 (block 128). If so, it is determined whether a filter or the semantic layer specifies alternative multi-values for the data 126. If not, the data is processed as outlined in FIG. 7 (block 128). If a filter or the semantic layer specifies alternative multi-values for the data, the alternative multivalues used in the data set are identified 130. For each alternative multi-value, font information is determined 132. The specific multi-value data for each alternative is then accessed, either through a filter or the semantic layer 134. The processing operations 104-116 of FIG. 7 are then performed 136. The largest value is saved and the processes is repeated for each of the multi-value alternatives (e.g., each language alternative) 138. The report designer 22 then provides the largest value needed to accommodate the strings that have been analyzed 140.

Figure 9:
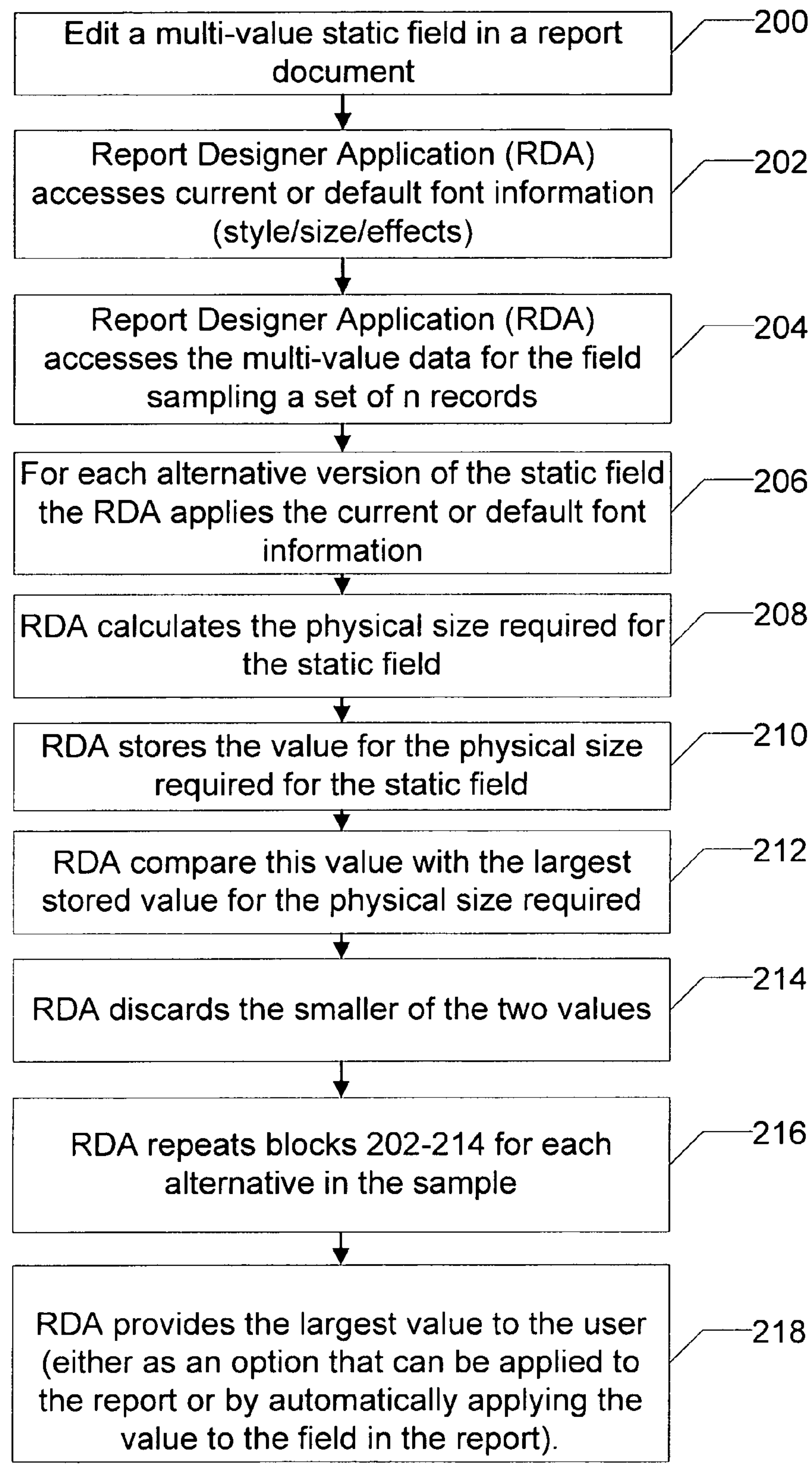
FIG. 9 illustrates a process for report field sizing of a multi-lingual text values in static text objects in accordance with an embodiment of the invention.

FIG. 9 illustrates operations utilized by an embodiment of the report designer 22 to process multi-value text values in static text objects. Initially, a multi-value static field in a report document is edited 200. The report designer 22 accesses current or default font information 202. The report designer 22 accesses the multi-value data for the field to sample a set of records (e.g., N records) 204. For each alternative version of the static field, the report designer 22 applies the current or default font information 206. The report designer 22 calculates the physical size required for the static field 208. The report designer then stores the value for the physical size required for the static field 210. Then, the report designer compares this value with the largest stored value for the physical size required 212. The report designer then discards the smaller of the two values 214. The operations of blocks 202-214 are then repeated for each alternative in the sample 216. Finally, the report designer 22 provides the largest value to the user, either as an option to be applied to the report or by automatically applying the value to the field in the report 218.

In addition to multi-lingual multi-value data for static fields, the invention is also applicable to other cases in which there are multiple versions of the report with variant static strings. The strings need not be stored in different languages. For example, there could be a formal and informal version of a report where the formal version is used externally and contains additional legal disclaimer language in the static fields. The existence of multiple versions of the report document could be flagged using a mechanism similar to the multi-lingual metadata associated with the report.

Figure 10:
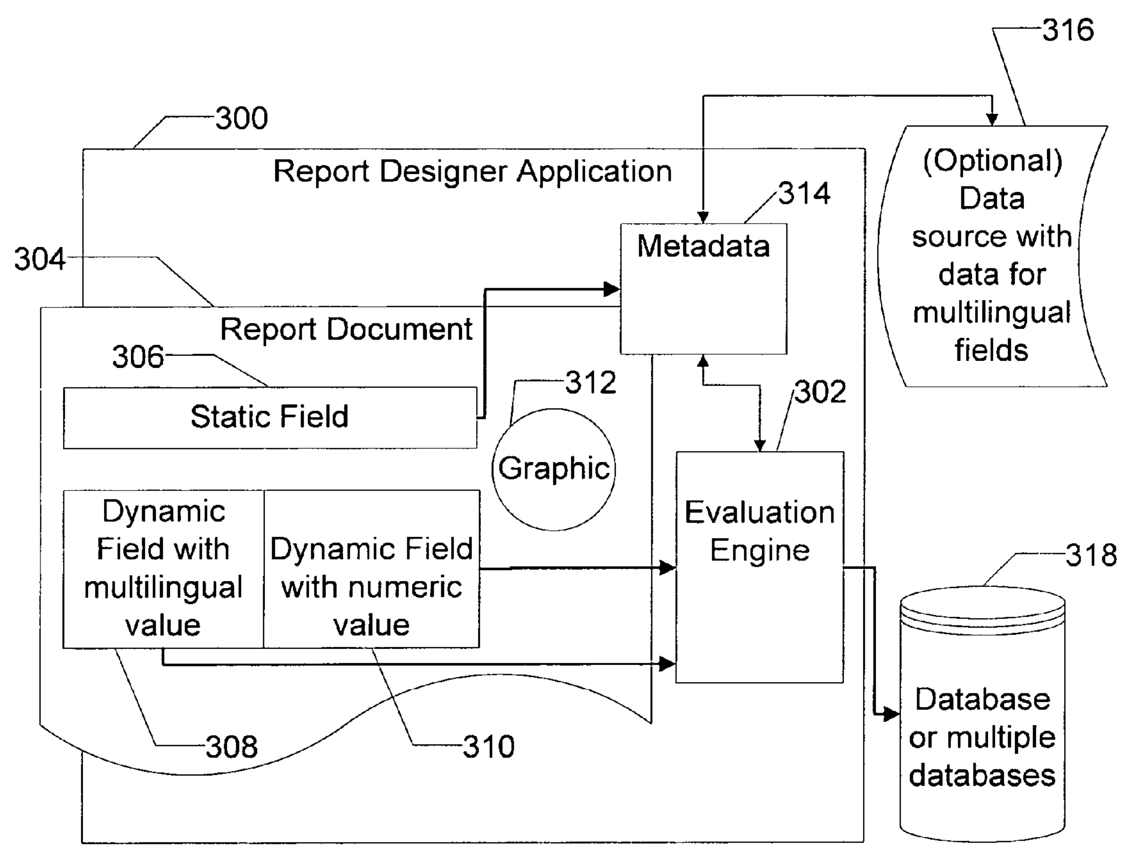
FIG. 10 illustrates the interaction of various system components associated with an embodiment of the invention.

FIG. 10 illustrates components associated with an embodiment of the invention. The automatic sizing operations associated with invention may take place within the context of a reporting system that contains one or more report documents 304 within a report designer 300. The report documents 304 access a data source, such as database 318 (or other data sources) for dynamic fields. In addition, the report documents 304 may access a data source 316 for the content of multilingual static fields.

The data for dynamic and static fields can be contained in any form of data source, although typically the data source for multilingual static fields would be a text file or simple database and the data source for the dynamic fields would be a database or multiple databases.

Metadata 314 regarding the document locale and font information can be stored within the report document 304. This metadata may contain a locale or version indicator, font information (e.g., type, size, and style) for that locale/version, and it may also contain specific text strings for a field identified by language/version. Alternately, the string information can be stored in a secondary data source 316. In one implementation, both the metadata and string information source is stored in an external object that is accessed from the report document through the report designer application.

Metadata concerning the locale/version specifications of a dynamic field can also be extracted from the database (or semantic layer) query that is used within the report document. Additionally, metadata regarding "character spacing exactly" settings can be associated with a language or font setting and stored in the internal metadata 314 or secondary data source 316. "Character spacing exactly" is a setting that specifies the exact spacing between characters (0.5 point, 0.75 etc) and is typically used with Asian languages. The report object can contain other objects, such as graphics 312 that are optionally taken into account when calculating the appropriate sizing of field objects.

In one embodiment, automatic sizing evaluation is performed by a field evaluation engine 302 that is part of the Report Designer Application (RDA) 300. Automatic sizing evaluation accesses metadata for the report's localization options and font information. In the case of dynamic fields, the field evaluation engine also determines a sample set that reflects the presence of multi-lingual data in the database. In this case, the sample for the dynamic field 308 contains the multi-lingual values, while the sample for field 310 only reflects one set of values for the field.

In the case of multi-lingual data, the sample is evaluated using the font information (e.g., font style, size, and effect) associated with the specified language. This information can be provided within the Report Designer Application (RDA) as a default value, within the report's associated metadata 314 or within an external object or data source.

Figure 11:
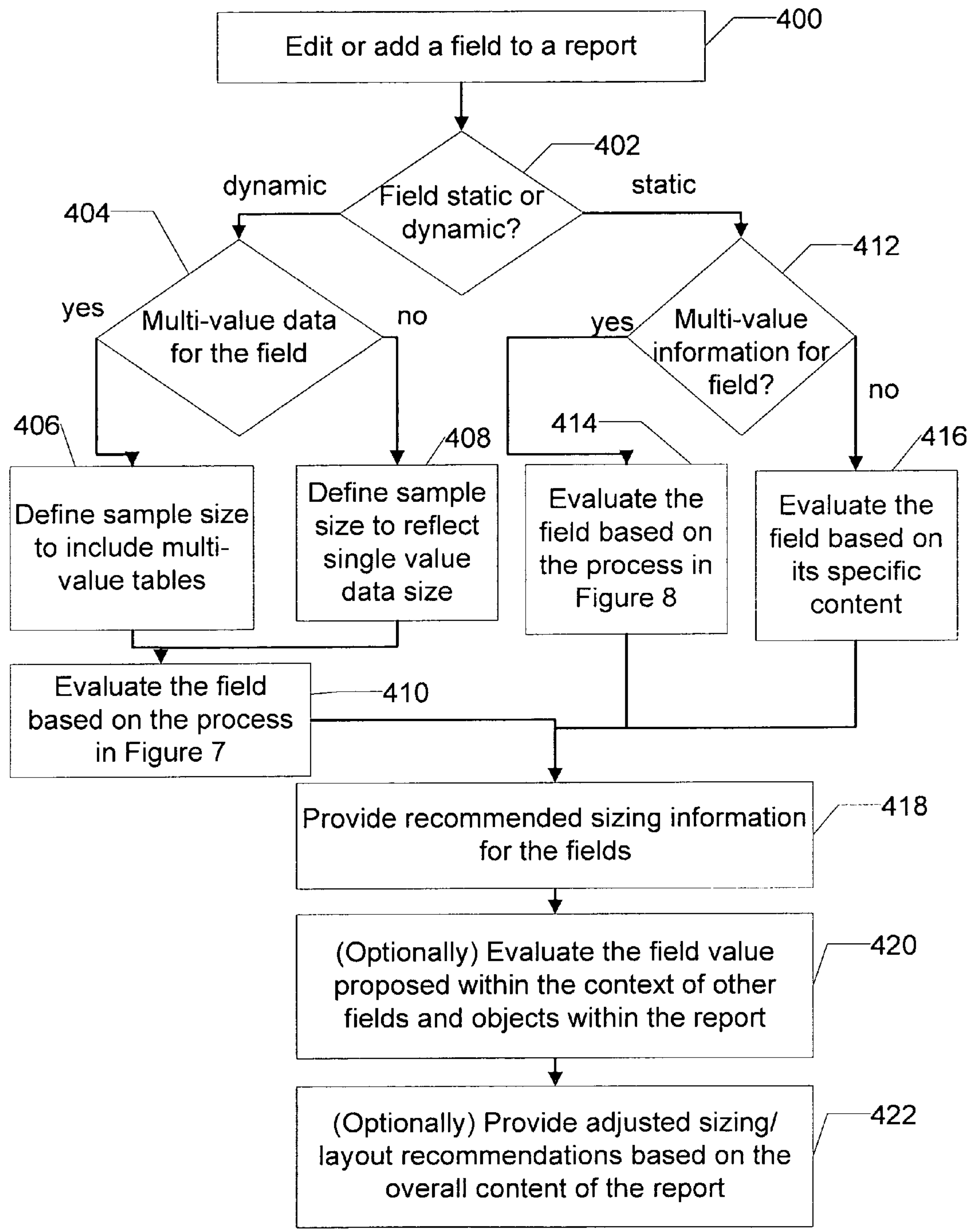
FIG. 11 illustrates a process for report field sizing of combined dynamic and static text objects in accordance with an embodiment of the invention.

FIG. 11 illustrates processing operations associated with the report designer 22 evaluating dynamic and static text objects. The process of FIG. 11 is particularly applicable to reports that have more than one version (e.g., multi-lingual reports) that contain both dynamic fields and static fields for which there are multiple (or multi-lingual) values. Multiple field values can be evaluated in parallel and the field evaluation engine contains logic to evaluate the larger context of the report template in order to evaluate the other objects within the report that the sizing/placement of the fields will need to accommodate. A table is a common scenario where the combined evaluation of dynamic and static text objects is required.

Initially, a report field is added or edited 400. It is then determined whether the field is static or dynamic 402. In the case of a dynamic field, a decision is made with respect to whether there is a multi-value data for the field 404. If so, the sample size is defined to include multi-value tables 406. If not, the sample size is defined to reflect a single value data size 408. In either case, the next operation is to evaluate the field based on the processing of FIG. 7 (block 410).

In the case of a static field, it is determined whether there is multi-value information for the field (block 412). If so, the field is evaluated based upon the process of FIG. 8 (block 414). If not, the field is evaluated based on its specific content (block 416). After either block 410 or 416, the next processing operation is to provide recommended sizing information for the fields (block 418). The proposed field value may then be evaluated within the context of other fields and objects within the report (block 420). Finally, the adjusted sizing recommendation based upon the overall content of the report is provided to the user (block 422).

Figure 12:
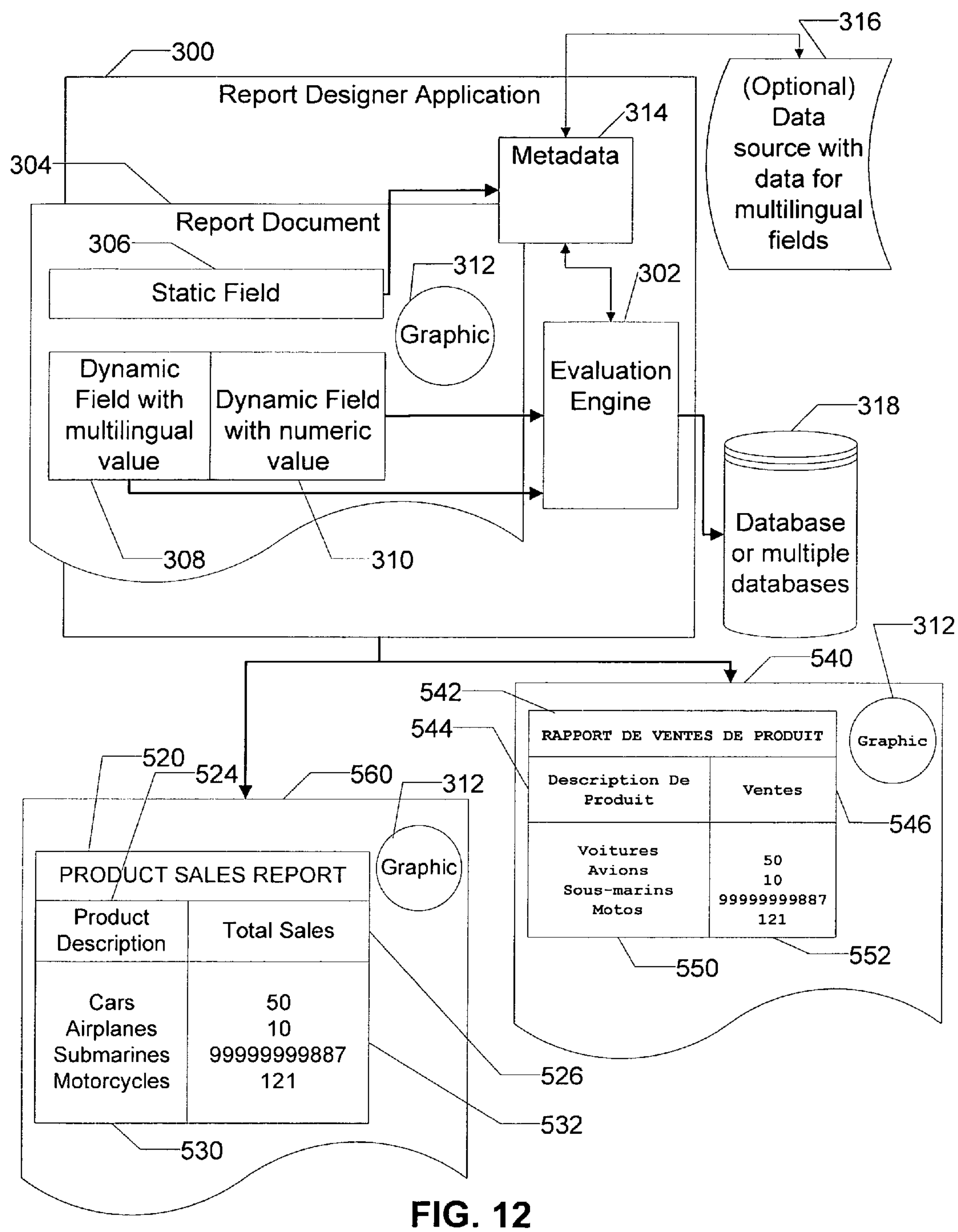
FIG. 12 illustrates the interaction of various system components associated with an embodiment of the invention.

FIG. 12 illustrates automatic sizing components associated with an embodiment of the invention, as used to produce multi-lingual reports. A report designer needs to create one report to show product sales that will be used by management for offices in England, France and Japan. The management in each office uses a different language version of the report—an English report 560, a French report 540, and Japanese report (not shown). The designer creates one version of the report and then it can be run with a specified language value to create specific instances for English, French and Japanese. For each language, appropriate font type, size, and effect choices are set.

The report designer 300 begins by creating a general report document template 304 that has the layout that is needed for the report. The designer specifies that there are English, French, and Japanese versions of the report in the metadata 314 associated with the report. The designer specifies that when the language is English an Arial font, 8 point, no effect (plain face) is to be used, when the language is French a New Courier font, 6 point, plain face is to be used, and when the language is Japanese an Arial Unicode MS font, 6 point, plain face font is to be used. This information about the report's language versions and the font information for each language are stored as metadata 314 associated with the report.

The report designer then adds a static field to the report, such as a title 520. The different values for the static field can either be stored within the report template or in a secondary data source that the report template accesses. In one implementation, this information is associated with metadata that specifies which languages this report is being created for and the font information for those languages. In this case, the alternative values for the static fields in the report have been saved with the metadata 314. The report designer specifies that the title of the report is Product Sales Report in English, Rapport De Ventes De Produit in French, and プロダクト販売レポートIn Japanese. The multi-lingual title information that is stored with the metadata is displayed in titles 520 and 542.

When automatic sizing evaluates how much space is required for this static field it takes these static string values, applies the specified font values to them, and calculates the space required by the string that requires the most page real estate. In this case the New Courier font applied to the French string requires more space as the font face is large and the font type is non-proportional. Based on this, the report designer calculates that the static field needs to be large enough to accommodate the French string.

Assume now that the designer adds a table of information to the report. This table contains static fields for the column headings. These static fields are stored with the report and are evaluated in the same manner as the report title.

Assume that the content of the table is dynamic. To evaluate the space required by the dynamic fields a sampling from the data source is required. The appropriate font information for the report language is then applied to the data that is sampled to calculate how much space is required to display the field correctly. In the case of Field 1 (530, 550), the values within this field are multilingual so it is necessary to sample the data set for each language with the font information applied to see how much space is required.

In this way, with auto-sizing the report designer knows that the report template that is designed will accommodate the range of values in the report, for example, the long sales figure (99999999887). The size of the field factors in the different fonts used for different language versions (or versions based on another differentiator) to ensure that the designer is able to easily create one report design that accommodates all of the values for all of the versions of the report.

Various enhancements and modifications of the disclosed technology are possible. For example, the invention may include an operation to apply data type specific standard formatting. This operation may be applied after block 104 of FIG. 7 or after block 204 of FIG. 9. This operation may be used to establish a standard format for a number or date. This formatting may be important in determining how many characters are used in a string. In the case of number formatting, standardization factors include representation of currency, number of decimals displayed, treatment of negative numbers, the use of separating commas, and the like. In the case of date formatting, a standard format may be used from any number of formats (e.g., 3/1/99, 1 Mar. 199, 01 Mar. 199, 03/01/199, etc.).

Observe that a static text field may contain one or more dynamic fields as an embedded field object. Consider the example of a title or heading—"Sales Report for March 2006". In this example, "Sales Report for" is a static string and the date "March 2006" is dynamic. In this case, the size of the static field is calculated and aggregated with the calculated size for the dynamic field. There may be different font settings on the static and dynamic components of the combined field. A static string may have multiple font characteristics applied to different parts of the static string. For example, some sections may be in bold or in a smaller font.

The invention may utilize any number of techniques to size a report field. Generally, the width and height of the report field will be modified. However, the report field may be modified by solely modifying the width or the height.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A computer readable medium storing executable instructions, comprising executable instructions to:

specify a report including a report field for displaying information, wherein the report includes information automatically retrieved from a data source, where the information includes multi-lingual text and is structured in accordance with a report schema that specifies the form in which the information should be presented, including font information;

perform an assessment of information that will potentially be displayed in the report field, wherein the executable instructions to perform an assessment include executable instructions to assess multiple data values of a data source and multi-lingual text including a first language using a first font and a second language using a second font;

size the report field in accordance with the assessment, wherein the report field is sized to accommodate a largest representation of the multi-lingual text based upon language and font;

provide a first instance of the report with the report field accommodating the multi-lingual text in the first language using the first font; and supply a second instance of the report with the report field accommodating the multi-lingual text in the second language using the second font.

2. The computer readable medium of claim 1 wherein the executable instructions to perform an assessment include executable instructions to assess font information selected from font type, font style and font size.

3. The computer readable medium of claim 1 further comprising executable instructions to repeat the executable instructions to perform and size in response to a change in field font setting.

4. The computer readable medium of claim 1 further comprising executable instructions to repeat the executable instructions to perform and size in response to a change in data source values.

5. The computer readable medium of claim 1 further comprising executable instructions to size the report field in accordance with restrictions associated with adjacent report fields within the report.

* * * * *